Dec. 13, 1932.                H. J. DOUGLASS                    1,890,936
            METHOD OF FORMING FLANGED CAN ENDS WITH CURLED EDGES
                    Filed Jan. 5, 1932        4 Sheets-Sheet 1
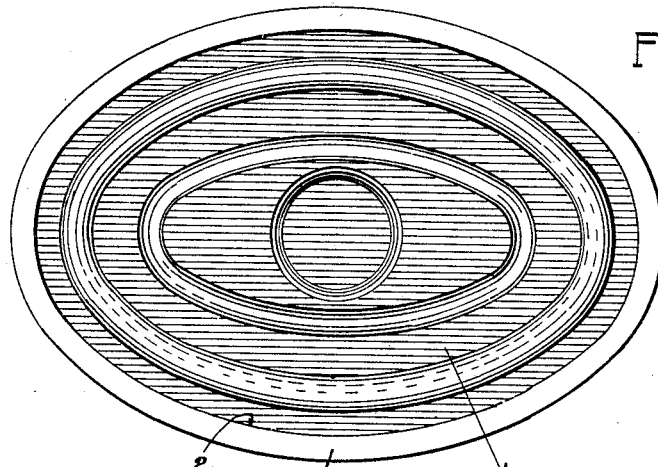
FIG.1.
FIG.2.
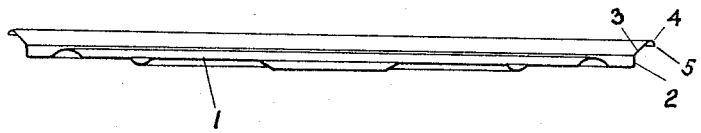
FIG.3.
FIG.4.
FIG.5.
INVENTOR
Henry James Douglass
By Marcus S. Leve
His Attorney.

Dec. 13, 1932.                H. J. DOUGLASS                1,890,936
           METHOD OF FORMING FLANGED CAN ENDS WITH CURLED EDGES
                   Filed Jan. 5, 1932         4 Sheets-Sheet 2

INVENTOR.
Henry James Douglass
By Marcus S. Leise
His Attorney.

Dec. 13, 1932.   H. J. DOUGLASS   1,890,936
METHOD OF FORMING FLANGED CAN ENDS WITH CURLED EDGES
Filed Jan. 5, 1932   4 Sheets-Sheet 3

INVENTOR
Henry James Douglass
By Marcus S. Levé
His Attorney

Dec. 13, 1932.   H. J. DOUGLASS   1,890,936
METHOD OF FORMING FLANGED CAN ENDS WITH CURLED EDGES
Filed Jan. 5, 1932   4 Sheets-Sheet 4
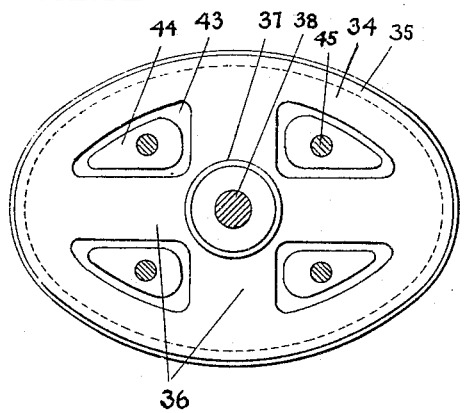
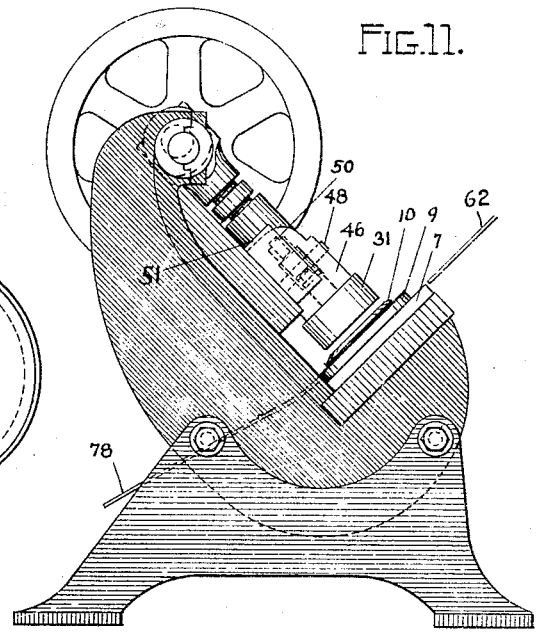
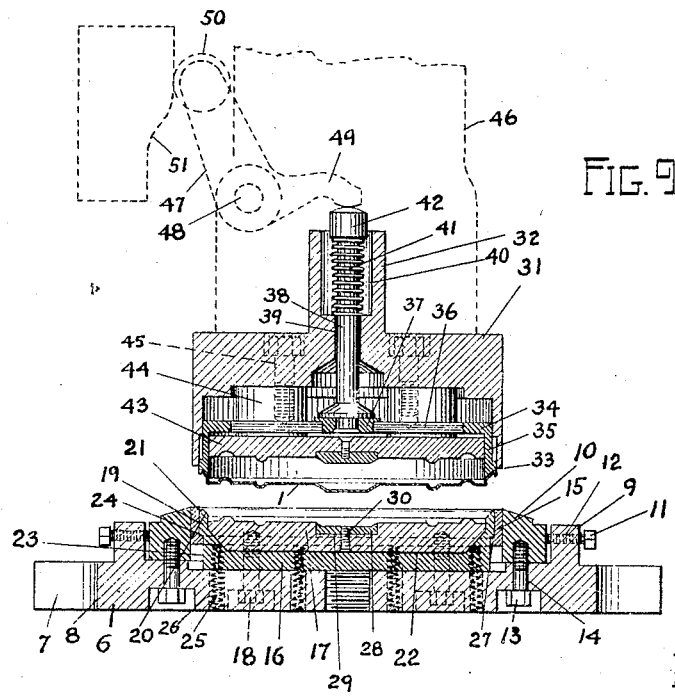
INVENTOR
Henry James Douglas.
By Marcus S. Leve
His Attorney Patented Dec. 13, 1932

1,890,936

UNITED STATES PATENT OFFICE

HENRY JAMES DOUGLASS, OF SAN FRANCISCO, CALIFORNIA

METHOD OF FORMING FLANGED CAN ENDS WITH CURLED EDGES

Application filed January 5, 1932. Serial No. 584,815.

The present invention relates to improvements in the method of forming flanged can ends with curled edges.

The said improvements are intended for stamping circular or noncircular shaped can ends, like square or oval and for forming flanges curled along the outer edges, whereby they are secured to flanged can bodies by double seaming.

The stamping and curling of the ends is accomplished in two operations, as it will appear from the specification and accompanying drawings, forming part thereof.

Figures 1 to 5 inclusive illustrate a non-circular can end, which is to be produced according to the method of my invention, while Figures 6 to 11 inclusive illustrate the construction and operation of the dies for forming said can ends.

Figure 1 of the drawing is a plan view of a non-circular can end.

Figure 2 is a longitudinal section of said can end, as it appears after the first operation, showing the flange at an angle with the plane of the general direction of the can end, and the extreme edge of the curl running in a direction perpendicular to said plane.

Figure 3 is a longitudinal section of the same can end after the second operation, when the flange has been brought down to coincide with the plane of the general direction of the can end, thus bringing the extreme curled edge inwards.

Figure 4 is a longitudinal section of the flange of the can end drawn to an enlarged scale, showing the curled edge after the first operation.

Figure 5 is a similar longitudinal section of the flange, showing the curled edge as it appears when finished after the second operation.

Figure 6:
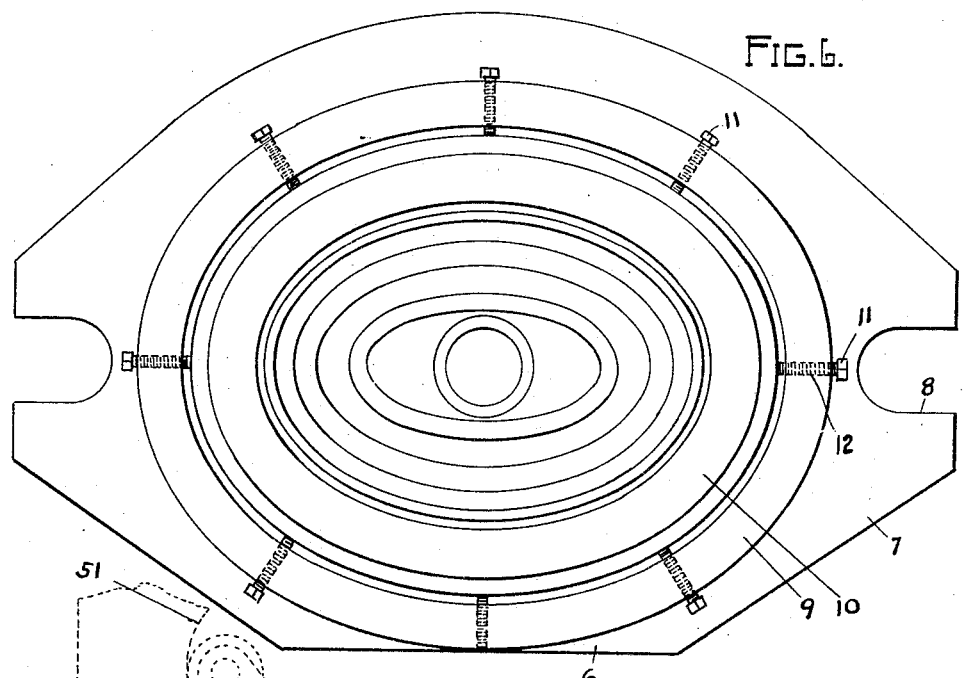
Figure 6 is a plan view of the lower die.
Figure 7:
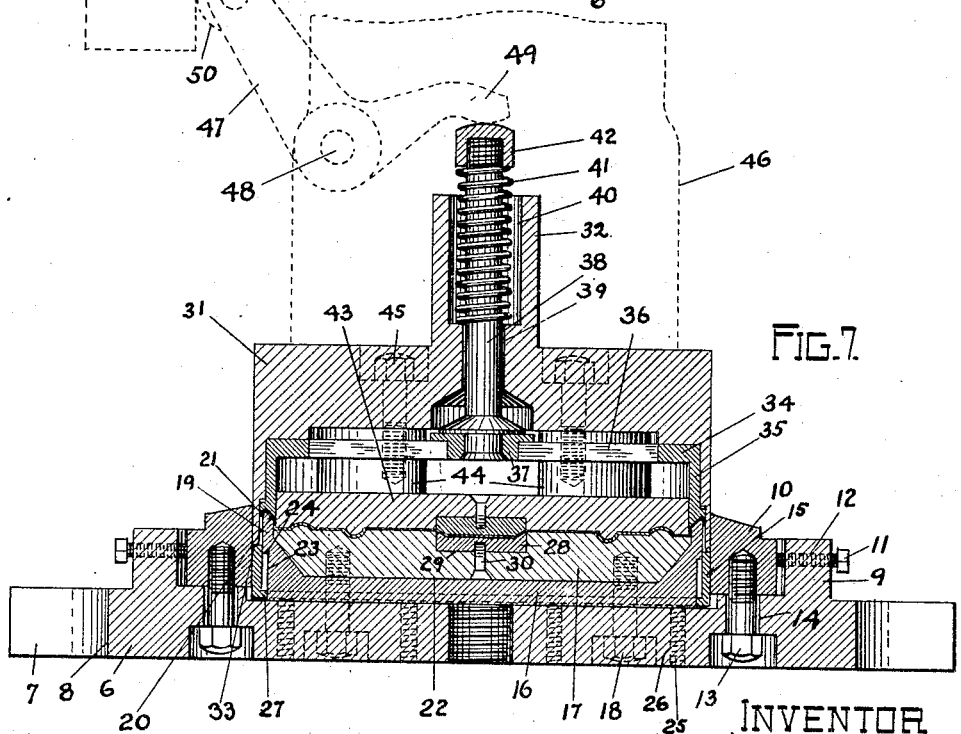
Figure 8:
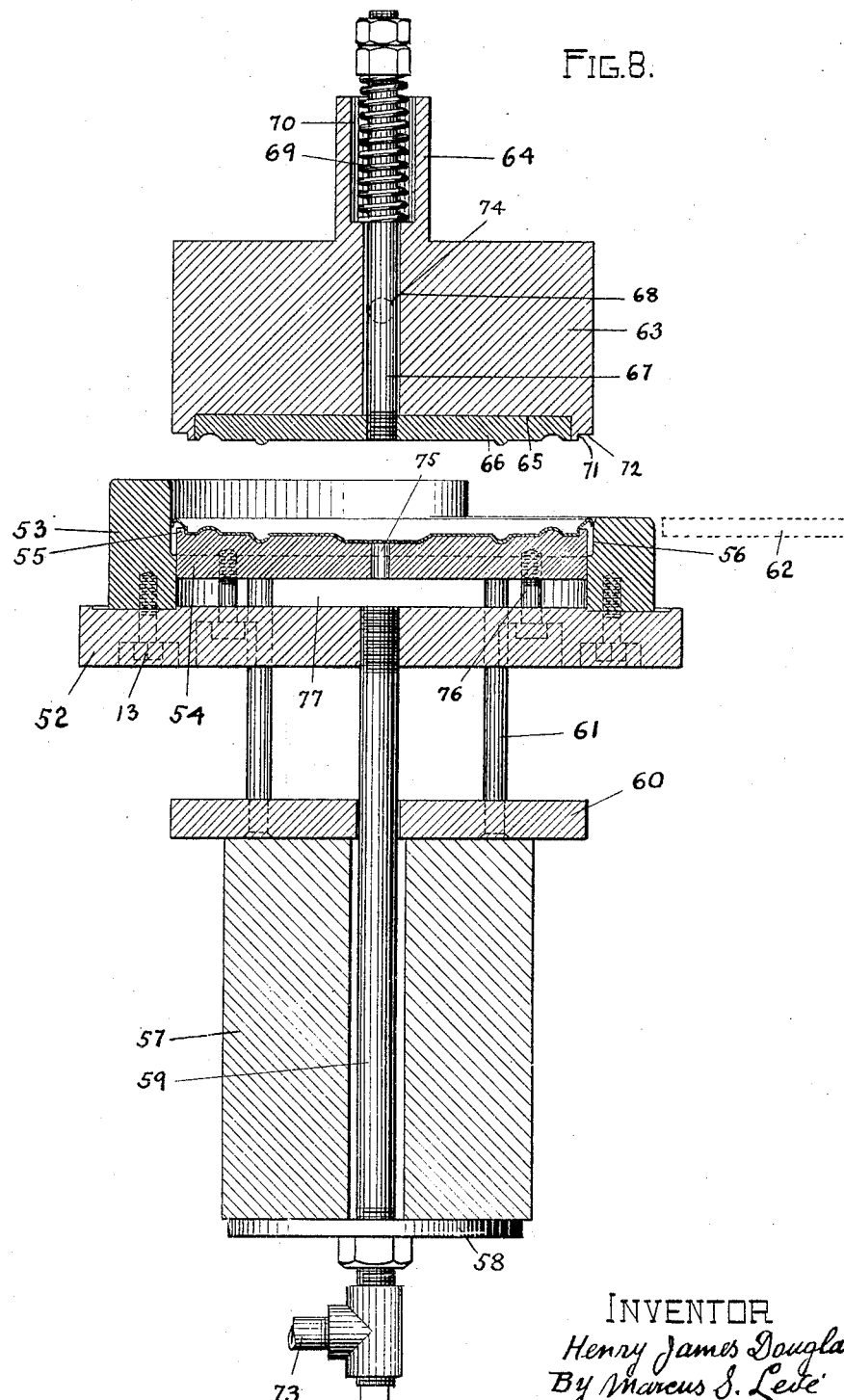

Figure 7 is a longitudinal section of the die for performing the first operation showing the upper die at the lower end of the stroke, upon the can end, Figure 8 is a longitudinal section through the center of the die for performing the second operation upon the can end, Fig. 9 is a longitudinal section of the die represented in Fig. 7, showing the upper die at the upper end of the stroke; Fig. 10 is a plan view of the curler die 34 and the punch central pad 43, showing the lugs 44 carried by said central pad, passing between the cross arms 36 of said curler die; and Fig. 11 is a side elevation of a press, carrying the upper and lower dies in their respective positions and showing the incline at which the dies are set in order to discharge the can ends by gravity.

The can ends 1, as shown in Figures 3 and 5, are generally formed with a shoulder 2 fitting the inside of the can body, and are provided with a flange 3 extending outwards, and having its outer edge 4 curled downwards and inwards; the inside diameter of the extreme edge 5 of the curl being considerably smaller than the inside diameter at the center of the curl at 4.

The method employed in my present invention for stamping such a curled flange, and being able to remove the can end from the lower die, without extending the diameter of the extreme edge, of the curl at 5, consists in forming the flange of the can end in two operations.

In the first operation the blank is cut from a sheet of tin plate, and stamped with the flange 3 tapering at a considerable angle, and with the outer edge curled for an angle of about 135° as shown in Figures 2 and 4; the extreme lower edge of the curl running in a direction perpendicular to the plane of the general direction of the can end, permitting the lifting of said can end from the upper surface of the lower die without destroying the curl.

After the first operation the can end is placed in another die, where the curled edge is no more acted upon directly, but is caused to turn inwards, by altering or removing the taper of the flange, thus bringing it to the required form shown in Figures 3 and 5.

The following is the description of the dies for performing the two operations.

The dies for the first operation are shown in figures 6, 7, 9 and 10; they comprise a lower die, and an upper die.

The lower die consists of the die shoe 6, formed with a flange 7, provided with bolt slots 8, whereby it is clamped to a punch press.

The die shoe is formed with a vertical flange 9, and within said flange is placed the cut-edge piece 10, and is clamped in place by the screws 13, passing through the holes 14 in the bottom of the die shoe, and may be adjusted sideways by the screws 11, working in the tapped holes 12 in the vertical flange 9. Within the cut edge piece 10 is placed the draw ring 15, and within said draw ring are placed the lower curler die pad 16, and the center die pad 17, both said die pads being secured to the die shoe 6 by means of the screws 18.

The lower curler die pad 16 is formed with an outer rim 19, having its upper surface so shaped, as to conform to the shape and inside dimensions of the flange 3 of the can end, said surface sloping upwards and outwards at a considerable angle as shown at 20, the extreme upper edge being rounded up at 21 to a small radius, corresponding to the required inside radius of the curl.

The central part of the lower curler die pad is formed with a recess 22, within which is fitted the center die pad 17, having its upper surface at the proper elevation, and so shaped, as to conform to all the indentations required in the can end.

The lower part of the lower curler die pad is reduced in diameter at 23, forming a shoulder 24.

The draw ring 15 is adapted to slide within the cut edge piece 10 and around the lower curler die pad 16, being held normally in an upward position by a number of coiled compression springs 25, placed within pockets 26, provided in the die shoe 6, and engaging at their upper end the bottom of the draw ring, keeping it up with the inner flange 27 of the ring resting against the shoulder 24, and holding it yieldingly against any pressure from above.

The center die pad 17 is provided with the interchangeable lower marker die 28 for stamping an identifying mark upon the can end, said marker die being fitted within a recess 29 in the center die pad, and secured to it by the screw 30.

The upper die consists of the punch 31 fitting the inside of the cut-edge piece 10 of the lower die, and provided with the stem 32, whereby it may be secured to the cross head 46 of a stamping press.

The lower edge of the punch is ground sharp at 33, and is adapted to cut the blank.

Within the punch 31 is fitted to slide the upper curler die 34, comprising an annular rim 35, having its lower surface formed to the shape of the outline of the can end flange, and having cross arms 36, connecting it with a central hub 37, where a guiding stem 38 is secured.

The stem 32 of the punch is furnished with a bore 39, adapted to guide the stem 38 of the upper curler die 34, the upper part of said bore being counterbored at 40, forming a nest for a coiled compression spring 41, surrounding the upper part of the stem 38.

The coiled spring 41 is resting at one end at the bottom of the counterbore, engaging at the other end the stem head 42, forcing it upwards, and thus keeping the curler die 34 in the upward position.

Within the upper curler die 34 is fitted the upper central pad 43, provided on its upper surface with the lugs 44, which, extending upwards, pass between the cross arms 36 of the curler die, and are secured to the body of the punch by the screws 45.

The operation of the dies is as follows:

When the upper die is at the end of its up stroke, a sheet of tin plate is placed upon the lower die, resting upon the upper edge of the cut-edge piece, and the press is operated to start the cross head 46, carrying the punch 31 down towards the lower die.

The cutting edge 33 of the punch reaches first the tin plate, and forces it against the cut edge piece 10, severing it along said edge, thus forming the blank.

The further motion of the punch carries the blank into the opening of the cut edge piece, where it comes in contact with the upper face of the draw ring 15, and becomes gripped all along its outer edge between the lower surface of the punch and the upper face of the yielding draw ring 15, and in this gripped condition it is lowered together with the draw ring into the opening of the cut-edge piece, compressing the springs 25.

When both dies come together, the blank takes the form shown in Figure 7, where the curling operation is finished, and all there remains to be done on the can end, is to bring the flange 3 from a direction at an angle to the plane of the general direction of the can end, as shown in Figures 2 and 4, to a direction coinciding with said plane, as shown in Figures 3 and 5, which is accomplished by the second operation hereinafter described.

On the return or upward stroke of the punch, the downward pressure upon the draw ring 15 being released, the ring is raised by the compression springs 25, and at the end of its upward stroke it engages the curled edge of the can end, lifting it out from the lower die. The can end is lifted by the upper die, being held by friction within the inner bore of the punch.

Near the end of the upward stroke of the punch the upper curler die is lowered, extracting the can end from the upper die, and letting it drop upon the inclined lower die, whence it is discharged over the apron 78.

The means for lowering the upper curler die consists of a bell crank lever 47, fulcrumed upon a pin 48, carried upon the cross head 46 of the press, and having an arm 49, engaging the stem head 42 of the punch curler, while the other arm of the bell crank lever carries a roller 50, engaging at the end of the upward stroke of the punch a stationary cam 51, which rocks the bell crank lever to the right, causing the lowering of the arm 49 together with the upper curler die, thus discharging the can end.

After the first operation the can end is delivered to a pair of dies adapted for the second operation, where the flange 3 is brought down to coincide with the plane of the general direction of the can end.

The dies for the second operation are illustrated in Figure 8, comprising a lower die, and an upper die.

The dies are secured to the body of a press at an incline to a horizontal direction, as shown in Fig. 11 in order to be able to feed the can ends by gravity, the side adjacent the guide 62 being higher than the opposite side.

The die comprises the die shoe 52, carrying the guide ring 53, secured to it by the screws 13.

Within the ring 53 is fitted to slide the lower pad 54, having the general form of outline of the can end, and its upper surface so shaped, as to receive the can end formed by the first operation.

An annular rim 55 is formed at the outer edge of the pad, fitting the shoulder 2 of the can end from the outside, the upper surface of said rim coinciding with the general direction of the surface of the pad.

The pad 54 is normally held inside the ring 53 in the upward position shown in the drawing, by means of a rubber cylinder 57, resting at the lower end upon a washer 58, suspended from the die shoe 52 by the pipe 59, and engaging at the other end of the disc 60, carrying the pusher rods 61, supporting said pad 54; while screws 76, secured in the pad and passing through holes in the die shoe 52, serve to limit the motion of the pad upwards.

The can ends are fed along the guides 62 to the lower die by gravity, where they are received at the counterbored upper part 56 of the ring 53.

Above the ring 53 is mounted the upper die.

The upper die is formed of the die body 63, finished at the outside to fit the counterbore 56 of the ring 53, and at the lower edge it is cut away to fit at 71 the inside of the shoulder 2 of the can end, while the upper surface 72 of the cut away is adapted to engage the inclined flange 3 of the can end, and flatten it out, when the die is at the lower end of the stroke. The die body is provided with the stem 64, whereby it is secured to the cross head of a press.

The lower surface of the die body is formed with a recess 65, within which is fitted to slide the upper pad 66, carrying a pad stem 67, passing through a bore 68 in the die body, and held upwards by a coiled compression spring 69, resting at one end in a counterbore 70, and engaging at the other end a nut, carried upon the upper end of the pad stem 67.

The upper die receives a reciprocating motion from the cross head of a press, and in coming down, the shoulder 71 of the die body enters the inside of the shoulder 2 of the can end, and the shoulder 72 engages the inclined flange 3, and flattens it out, giving it the shape, shown in Figure 5 of the drawing.

For the ejection of the can end from the lower and upper dies the pipe 59 is furnished with a nipple 73, and the upper die is furnished with a nipple 74.

The nipple 73 is connected to a reservoir containing air under a vacuum, and a controlling valve is placed in said connection, whereby the nipple 73 may be connected with said vacuum reservoir, or opened to the atmosphere; and the nipple 74 leads to a controlling valve, whereby the bore 68 may be connected to a vacuum reservoir, or disconnected from said reservoir, and connected to a tank containing air under pressure.

At the end of the downward stroke of the upper die the vacuum is released inside the pipe 59, while vacuum is applied in the bore 68; the can end will thus be held by the upper die, and in the upward movement of the latter will be raised off the lower die. The vacuum is then released from the bore 68, and pressure produced therein.

The compressed air, entering between the upper surface of the upper pad 66 and the die body 63, forces said pad down, pulling the can end off the shoulder 71 of the upper die, and discharges it.

A new can end is then delivered upon the lower die, and vacuum is produced inside the pipe 59 leading to the space 77 below the lower pad 54, and through the hole 75 to the space below the can end. The preponderance of pressure of the atmosphere upon the upper surface of the can end lowers said can end, seating it upon the pad 54, ready to be stamped by the downward motion of the upper die body.

The method of forming flanged can ends with curled turned in edges has thus been described, and one of the means whereby said method may be accomplished has been illustrated and described, and it is obvious, that many modifications may be made in the construction of said means. I therefore do not desire to limit my invention to the specific construction herein shown and described.

I claim as new and desire to secure by Letters Patent:

1. The method of forming flanged can ends with curled turned in edges comprising the stamping of can ends with tapering flanges having curled non-inwardly turned outer edges, and the turning of said curled edges inwards after said stamping by altering the angle of taper of said flanges.

2. The method of forming flanged can ends with curled turned in edges comprising the stamping of can ends with tapering flanges having curled non-inwardly turned outer edges in one operation and in turning of said curled edges inwards by altering the angle of taper of said flanges in a second operation.

In testimony whereof I affix my signature.

HENRY JAMES DOUGLASS.